United States Patent [19]

Padget

[11] Patent Number: 4,504,614

[45] Date of Patent: Mar. 12, 1985

[54] METHOD OF THICKENING AQUEOUS LATEX COMPOSITIONS

[75] Inventor: John C. Padget, Frodsham, England

[73] Assignee: Imperial Chemical Industries PLC, London, England

[21] Appl. No.: 533,815

[22] Filed: Sep. 19, 1983

[30] Foreign Application Priority Data

Oct. 21, 1982 [GB] United Kingdom ............... 8230051
Jun. 30, 1983 [GB] United Kingdom ............... 8317803

[51] Int. Cl.$^3$ .............................................. C08K 3/36
[52] U.S. Cl. ................................... 524/284; 524/493; 106/14.14; 106/14.44
[58] Field of Search ................... 524/284, 492, 493; 106/14.13, 14.14, 14.44

[56] References Cited

FOREIGN PATENT DOCUMENTS 2075538 11/1981 United Kingdom .

Primary Examiner—Paul Lieberman
Assistant Examiner—Amelia B. Yarbrough
Attorney, Agent, or Firm—Cushman, Darby & Cushman

[57] ABSTRACT

A method of thickening an acidic aqueous coating composition comprising tannic and a latex of a film-forming polymer substantially free from non-ionic surfactants, characterized in that a water-soluble thickening agent for the aqueous latex which is noncomplexing with tannic acid is incorporated into the aqueous composition in the form of a gel-like aqueous dispersion containing evenly dispersed particles of fumed silica, said thickening agent also being compatible with the tannic acid as used in the aqueous coating composition. The thickened acidic aqueous coating composition so produced is storage stable.

22 Claims, No Drawings

METHOD OF THICKENING AQUEOUS LATEX COMPOSITIONS

This invention relates to a method of thickening aqueous latex compositions, and more particularly to a method of thickening aqueous latex compositions containing tannic acid together with a film-forming polymer latex. The invention also relates to the thickened aqueous latex compositions so produced.

It is known to use acidic aqueous solutions of tannic acid in the treatment and protection of rusty ferrous substrates (for example wire-brushed rusty steel). It appears that the tannic acid forms a complex with the iron salts at the surface of the rusty substrate, thereby not only binding any loose particles of rust but also providing some degree of protection against further rusting. The reaction of the tannic acid at the surface of the ferrous substrate to remove the rust and form a protective layer is manifested by the typical appearance of a dark, virtually black, coating.

It is also known (as described in the specification of GB A No. 826564) to use tannic acid in conjunction with a paint comprising an acidic aqueous latex of a film-forming polymer, thereby providing a further degree of protection of the treated substrate.

It is very desirable to be able to increase the viscosity of compositions containing tannic acid together with a film-forming latex. Unless the viscosity is suitably increased it is difficult to achieve adequate film thickness and furthermore the composition tends to flow off non-horizontal surfaces, thereby making it difficult to ensure proper application by brush.

In practice it is difficult to achieve, merely by addition of a water-soluble thickening agent, a composition containing tannic acid and a film-forming latex which has both the desired viscosity and the necessary storage stability (i.e. which does not irreversibly settle or solidify upon storage). In many ordinary commercial polymer latices (not of course containing tannic acid) which are often prepared by employing ionic (cationic or anionic) surfactants, the addition of a thickening agent to the polymer latex often causes destabilisation of the system; as a result, flocculation occurs (the latex becoming unsuitable as a film former) and the polymer may precipitate from the latex. Thickened commercial polymer compositions containing a thickening agent (again, not of course containing tannic acid) of the required stability are, however, often achievable by the incorporation of non-ionic surfactants (eg a surfactant based on polyethylene oxide, a cellulosic derivative, or upon polyvinyl alcohol) either during polymerisation or subsequently. Unfortunately, polymer latex/thickening agent systems incorporating non-ionic surfactants where tannic acid is additionally present are in our experience generally unstable, because of interaction between the tannic acid and the non-ionic surfactant; as a consequence the stabilising effect of the surfactant is destroyed; furthermore the interaction reduces the ability of the tannic acid to complex with the substrate, thereby making the protection of the substrate less effective.

This interaction between tannic acid and non-ionic surfactants has indeed been observed elsewhere in the literature. For example GB-A No. 2 075 538 in Example 6 shows that latices containing polyethylene oxide-based non-ionic surfactants when added to tannic acid solution cause severe coagulation. In GB-A No. 2 075 538 storage-stable film-forming latex compositions containing tannic acid (for use as rust-protecting/removing primers) are achieved by using an ionically stabilised latex of a film-forming polymer which polymer has covalently bound acid groups (eg a carboxylated polymer). According to this patent specification, it is possible (inter alia) to achieve a thickened latex composition without loss of storage stability by the addition of a thickening agent to such a composition. Our experience, however, indicates that this solution to the problem of using thickening agents is not a generally successful one as destabilisation still occurs with other ionically-stabilised polymer latices containing tannic acid, either rapidly or eventually, even when using the preferred thickening agent of GB-A No. 2 075 538 (acid salt of alginic acid). Consequently we have sought another solution to the problem.

We have found that a stable, thickened composition may be prepared in the absence of non-ionic surfactants by the use of a thickening agent introduced as a component of an aqueous dispersion of finely-divided fumed silica ($SiO_2$) particles.

According to the present invention there is provided a method of thickening an acidic aqueous coating composition comprising tannic acid and a latex of a film-forming polymer which composition is substantially free from non-ionic surfactants, characterised in that a water-soluble thickening agent for the aqueous latex which is non-complexing with tannic acid is incorporated into the aqueous coating composition in the form of a gel-like aqueous dispersion containing evenly dispersed particles of fumed silica, said thickening agent also being compatible with the tannic acid as used in the aqueous coating composition.

According to another aspect of the invention there is provided a thickened acidic aqueous coating composition comprising tannic acid and a latex of a film-forming polymer which composition is substantially free from non-ionic surfactants characterised in that the aqueous coating composition has been thickened with a thickening composition comprising a gel-like aqueous dispersion comprising a water-soluble thickening agent for the aqueous latex which is non-complexing with tannic acid and containing evenly dispersed particles of fumed silica, said thickening agent also being compatible with the tannic acid as used in the aqueous coating composition.

The thickening composition may optionally also contain tannic acid, and in a preferred embodiment all the tannic acid to be used in the acidic aqueous coating composition is introduced with the thickening composition. In other words, in this preferred embodiment all the tannic acid used in the aqueous coating composition is introduced therein as a component of the gel-like aqueous dispersion of the thickening agent.

The gel-like aqueous dispersion containing the thickening agent and the dispersed silica particles acts to thicken the polymer latex containing tannic acid while at the same time rendering it storage-stable for prolonged periods of time—often even at relatively high temperatures (up to eg 60° C.). It is believed that the silica particles may be "structuring" the gel-like dispersion, and that the thickening agent may be becoming adsorbed on the silica particles (acting as a support for the agent); as a result the thickening agent may thus not be in a form which will effect flocculation or coagulation of the polymer latex.

The fumed silica used in the invention is a very finely divided form of silica having particles of submicron dimensions. Various grades of fumed silica are sold by Degussa under the general grade name "Aerosil", these grades having average primary particle sizes typically within the range 7 to 16 nm and being of very high purity having regard to silica content (greater than 99.8%). The "Aerosil" fumed silica is said to be a coagulated silicon dioxide obtained from the hydrolysis of silicon tetrachloride in an oxygen-hydrogen flame.

The polymers which may be used as the film-forming polymer in the aqueous latex used in the present invention include homopolymers and copolymers of the following:
vinyl chloride;
vinylidene chloride;
vinyl esters of alkanoic acids having from 1 to 18 carbon atoms in the alkyl group, especially vinyl acetate;
acrylic and methacrylic esters of alkanoic acids having from 1 to 18 carbon atoms in the alkyl group,
especially the said esters having from 1 to 12 carbon atoms in the alkyl group, for example the methyl, butyl or 2-ethylhexyl esters;
acrylonitrile, methacrylonitrile;
mono-ethylenically unsaturated hydrocarbons, for example ethylene, isobutene, styrene and alpha-methyl styrene.

The polymers may also (optionally) contain a small proportion of one or more aliphatic alpha-beta unsaturated carboxylic acids. The proportion of such acid(s) may be, for example, from 0.2 parts to 10 parts by weight per hundred parts of the total monomer components of the polymer. Acids which may be used include acrylic, methacrylic, itaconic and citraconic acids.

The present invention is especially advantageous when the polymer in the aqueous latex is derived from one or more chlorine-containing monomers, for example a copolymer of (i) vinyl chloride, (ii) vinylidene chloride and (iii) one or more alkyl acrylates or alkyl methacrylates having from 1 to 12 carbon atoms in the alkyl group; such polymers may optionally contain one or more aliphatic alpha-beta unsaturated carboxylic acids, and typical proportions for such acids and typical acids are as described in the preceding paragraph. Examples of such copolymers are those described generally and specifically in the specifications of our U.K. Pat. No. 1 558 411 and our European Application No. 80303804.1.

The preparation of the aqueous latex of the polymer may be carried out by well-established emulsion polymerisation techniques, for example as described in U.K. Pat. No. 1 558 411. It will be understood that the use of non-ionic surfactants is to be avoided because (as explained above) they interact with tannic acid; the use of ionic, particularly anionic, surfactants in the polymerisation does no harm, however, and indeed it may be advantageous to incorporate an additional ionic surfactant added after polymerisation into the thickened aqueous composition as this can improve the wetting-out of the composition onto a rusty substrate.

The suitability of a particular water-soluble thickening agent may be readily evaluated by a simple trial. Clearly unsuitable thickening agents are those which form water-insoluble complexes with tannic acid and can be recognised by the formulation of a floc or precipitate (often black or dark blue) on mixing aqueous solutions of the thickening agent and tannic acid in the concentrations envisaged for use in preparation of the coating composition. Examples of such complex-forming thickening agents are polyethylethene oxide, polyvinyl alcohol, and starch.

A thickening agent will also be unsuitable if it is incompatible with the tannic acid as used in the composition; by incompatible is meant that the thickening agent solution will not form a homogeneous dispersion with the tannic acid solution and e.g. precipitation of the thickening agent occurs instead, or separation of the thickening agent and tannic acid solution occurs to yield separate layers. Such incompatible thickening agents can usually be recognised by simply thoroughly mixing aqueous solutions of the thickening agent and tannic acid in the concentrations envisaged for use in preparation of the coating composition, whereupon separation or precipitation as described above occurs. Examples of such incompatible thickening agents are polyurethanes, polyacrylic acid, polyacrylamide, and cellulosics like hydroxypropylmethyl cellulose. Occasionally, although mixing the thickening agent and tannic acid solutions yields a homogeneous dispersion, an inhomogeneous dispersion is nevertheless obtained when fumed silica is additionally present (showing that the thickening agent is one which is incompatible with the tannic acid as used in the composition and hence unsuitable for use in the invention); examples of such further unsuitable thickening agents are deuteron (xanthagalactomannen gum) and alginic acid (sodium salt thereof).

Suitable water-soluble thickening agents for use according to the invention include xanthan gums which are linear polysaccharides (for example "Kelzan" S) and maleic anhydride/methyl vinyl ether copolymers (for example "Thickener" LN).

The relative proportions of tannic acid, film-forming polymer latex, thickening agent and silica support material may be varied over wide ranges depending upon such factors as the particular polymer latex used, the desired viscosity and the degree of stability required. In our general experience, it is advisable to use at least 0.5% (by weight on the film-forming polymer) of tannic acid in order to ensure an adequate minimum level of rust removal and protection. A usual range of tannic acid concentration is 3 to 15%. The fumed silica is typically present in the range 1 to 5% (by weight on film-forming polymer) and the thickening agent typically in the range 0.05 to 0.8% (by weight on film-forming polymer).

The pH of the thickened latex composition is typically in the range from 1 to 4.

The thickened aqueous coating compositions of the invention may include other additives such as stabilisers, fillers, pigments, dyes, plasticizers and fungicides.

The thickened coating compositions of the invention are intended mainly for use as providing primer layers for subsequent painting, although of course treated substrates may be used "as is" without further treatment.

The invention is illustrated by the following Examples. (The prefix C denotes a comparative Example).

EXAMPLE 1

20 grams of tannic acid were dissolved in water (71 grams). A mixture of 8 grams of fumed silica ("Aerosil" 300, average primary particle size 7 nm) and 1 gram of xanthan gum thickening agent ("Kelzan" S) was added to the tannic acid solution and mixed in with high-speed stirring to yield a thick smooth gel-like brown dispersion.

15 grams of the gel-like dispersion were mixed with 100 grams of an aqueous latex of a copolymer (viscosity about 15 centipoise) of vinylidene chloride/vinyl chloride/2-ethyl hexyl acrylate/acrylic acid (containing 60% by weight of solids) prepared using sodium lauryl sulphate (0.15% by weight on total monomer) as the emulsifying surfactant; the mixture was prepared by rolling the components together for about 5 hours. The resulting level of tannic acid was therefore 5% (by weight on copolymer weight), the level of silica 2% (by weight on copolymer weight) and the level of xanthan gum 0.25% (by weight on copolymer weight). The viscosity of the resulting thickened latex was 35 centipoise (measured using a rotoviscometer, $180s^{-1}$, immediately after preparation) and the thickened latex was still stable upon storage for 1 month at 60° C.

The thickened latex could be applied as a thick layer by brushing onto a wire-brushed rusty steel panel which, after drying, formed a blackish coating typical of a tannic acid-treated ferrous substrate.

EXAMPLE 2

Example 1 was repeated—with much the same result. The viscosity of the resulting thickened latex (after standing overnight) was 33 centipoise and the thickened latex was stable upon storage for 6 months at 40° C. (no drop in viscosity being observed).

EXAMPLES 3 AND 4

The procedure of Example 2 was used except that in Example 3 the amount of tannic acid used was 6.6% (by weight on copolymer weight), the amount of fumed silica was 2.7% (by weight on compolymer weight) and the amount of xanthan gum used was 0.3% (by weight on copolymer weight); and in Example 4 the amount of tannic acid used was 8.3% (by weight on copolymer weight), the amount of fumed silica used was 3.3% (by weight on copolymer weight) and the amount of xanthan gum used was 0.4% (by weight on copolymer). (These quantities were achieved by adding 20 g and 30 g of the gel-like dispersion to 100 g of latex in Examples 3 and 4 respectively, instead of 15 g as in Example 2).

The viscosities of the resulting thickened latices from Examples 3 and 4 (after standing overnight) were respectively 67 and 72 centipoise. Again, both were easily applied by brush to rusty steel panels (to form typical blackish coatings) and both were still stable upon storage for 6 months at 40° C. (no drop in viscosity being observed).

EXAMPLES 5, 6 AND 7

The procedure of Examples 2, 3 and 4 was repeated in these Examples except that in each case an anionic surfactant ("Dowfax" 2A1; sodium salt of dodecylated oxydibenzene disulphonate) was incorporated into the thickened latex at a 0.1% level (by weight on the weight of the thickening gel-like dispersion to be mixed with the copolymer latex) at the stage of preparing the gel-like thickening dispersion. This made no difference whatever to the gel-like dispersions or the resulting thickened copolymer latices (in particular the viscosities and storage characteristics were identical) save for the fact that the thickened compositions wetted rusty steel substrates noticeably more readily.

EXAMPLES 8, 9 AND 10

The procedure of Examples 2, 3 and 4 was repeated except that in place of xanthan gum as the thickening agent there was used 2 g of a 15% w/w aqueous solution of methyl vinyl ether/maleic anhydride copolymer ("Thickener" LN). The levels of "Thickener" LN in Examples 8, 9 and 10 were therefore respectively 0.07%, 0.10% and 1.24% w/w on copolymer, with the levels of tannic acid and silica being substantially as in Examples 2, 3 and 4 respectively.

As with Examples 2, 3 and 4, the gel-like thickening dispersions prepared in Examples 8, 9 and 10 were thick smooth gel-like brown dispersions and the resulting thickened latices had viscosities 30, 58 and 65 centipoises respectively (after standing for 24 hours) and were storage stable for 6 months at 40° C. (only a very marginal drop in viscosity being observed).

EXAMPLES 11, 12 AND 13

The procedure of Examples 8, 9 and 10 was repeated in these Examples except that in each case the anionic surfactant "Dowfax" 2A1 (0.1%) was incorporated at the stage of preparing the gel-like thickening dispersion (as in Examples 5, 6 and 7). Again, this made no difference to the gel-like dispersions and little difference to the resulting thickened copolymer latices (in particular the viscosities and storage characteristics were identical) save for the fact that the thickened compositions wetted rusty steel substrates more readily.

EXAMPLES 14 AND 15

These Examples followed the procedure of Example 3 except in that instead of "Aerosil" 300 (average primary particle size 7 nm) there were used the following as thickening agents:

Example 14; "Aerosil" 200 fumed silica (average primary particle size 12 nm).

Example 15; "Aerosil" 150 fumed silica (average primary particle size 14 nm).

Smooth thick gel-like thickening dispersions were obtained in each case and the resulting thickened copolymer latices had viscosities (after standing 24 hours) as follows:

Example 14; 55 centipoise

Example 15; 42 centipoise

These latices were stored at 40° C. for 1 month and were found to have undergone no decrease in viscosity or stability.

Similar results were obtained when the thickener "Kelzan" S gum (used in these examples) was replaced by "Thickener" LN.

EXAMPLES 16 AND 17

The procedures of Examples 3 and 9 respectively were followed in Examples 16 and 17 except in place of 8 g "Aerosil" 300 there was employed in both cases 8 g of "Aerosil" COK 84 which is a mixture 85% by weight fumed silica and 15% alumina.

Similar results were achieved, the resulting thickened copolymer latices of Examples 16 and 17 each having viscosities of about 60 centipoise (the unthickened latices having viscosities of about 15 centipoise) and being storage stable (1 month at 40° C. at the time of writing these Examples).

EXAMPLE 18

In Example 18, the procedure of Example 3 was followed except that in place of 8 g of "Aerosil" 300 there was used a mixture of 4 g of "Aerosil" 300 and 4 g of barytes (BaSO$_4$) particles, and 20 g of the thickening dispersion was used with 200 g of the copolymer latex. The resulting thickened latex had a viscosity of 32 centipoise and was found to be storage stable at 40° C.

EXAMPLES C19 AND C20

In these Examples, the procedure of Example 3 was followed except that in place of 8 g of Aerosil 300 there was used in Example C21 8 g of a precipitated silica (—not fumed silica; average primary size 40 nm), and in Example C20 8 g of barytes (BaSO$_4$) particles.

In each case no thickening of the copolymer latex was achieved.

EXAMPLE C21

In this Example, a series of experiments was carried out to investigate potential alternative water-soluble thickening agents for use in the invention. All proved to be unsuitable as they either complexed with tannic acid, or were incompatible with tannic acid as used in the compositions of the invention.

In each case 10 g of a 2% w/w aqueous solution of the potential thickening agent was mixed with 50 g of a 20% w/w aqueous solution of tannic acid and the mixture shaken on an electrical shaking machine for 1 hour. The results with the various potential thickening agents were as follows:

| Potential Thickening Agent | Reason for Unsuitability |
| --- | --- |
| polyethylene oxide | complex formed |
| polyvinyl alcohol | complex formed |
| starch | complex formed |
| polyurethane | incompatible |
| polyacrylic acid | incompatible |
| polyacrylamide | incompatible |
| hydroxypropylmethyl cellulose | incompatible |
| deuteron (xanthagalactomannen gum) | compatible unless fumed silica added, then incompatible |

EXAMPLE C22

In this Example, an attempt was made to thicken the copolymer latex used in Example 1 in the presence of tannic acid without employing fumed silica. To 86.2 g of the copolymer latex was added 12.9 g of a 20% w/w aqueous solution of tannic acid and 0.9 g of 'Kelzan' S thickening agent (xanthan gum) and the mixture rolled overnight to ensure good dispersion. The mixture was examined after allowing to stand for 2 hours; flocculation, which increased on further standing, was observed and a hard settlement resulted.

EXAMPLE C23

In this Example, an attempt was made to employ the technique described in GB-A No. 2 075 538, using the copolymer latex of Example 1.

Tannic acid (2.61 g), alginic acid sodium salt (0.13 g) and water (10.31 g) were mixed on a high speed stirrer and the resulting dispersion mixed with the copolymer latex (86.95 g; 60% solids). Within 3 hours the mixture had coagulated. In a series of experiments, the above-described formulation was repeated except that in each case 1 to 4% w/w (on copolymer) of an anionic surfactant was added to the latex before the addition of the tannic acid/alginic acid (sodium salt) dispersion in attempts to stabilise the resulting dispersion. The anionic surfactants were: "Dowfax" 2A1 (sodium salt of dodecylated oxydibenzenesulphonate), "Nansa" AS40 (ammonium dodecylbenzenesulphonate) and "Empicol" LZV (medium cut lauryl alcohol sulphate). In all experiments, the mixture was still unstable, and coagulation occurred within 3 hours.

In another formulation, tannic acid (3.08 g) was dissolved in water (31.65 g) at 40° C. and alginic acid (sodium salt) (0.41 g) premixed with a coalescing aid (2.57 g) was added to the tannic acid solution with agitation. When all the alginic acid salt had dissolved the copolymer latex (62.28 g of the 60% solids latex) was added to the mixture with further agitation. The resulting mixture had not thickened at all. After storage at 40° C. for 72 hours there was slight flocculation and settlement.

EXAMPLE C24

This experiment shows the detrimental effect of using a non-ionic surfactant in the presence of tannic acid.

A non-ionic surfactant (Synperonic PE 39/70; 6.50 g as a 30% w/w aqueous solution) was mixed with 81.30 g of the copolymer latex used in Example 1 (60% solids) and to this stabilised dispersion a tannic acid solution (12.20 g as a 20% w/w aqueous solution) was added. Total coagulation occurred. Increasing the amount of non-ionic surfactant from 3% to 7% increased the rate of coagulation.

I claim:

1. A method of thickening an acidic aqueous coating composition comprising tannic acid and a latex of a film-forming polymer which composition is substantially free from non-ionic surfactants, wherein a water-soluble thickening agent for the aqueous latex which is non-complexing with tannic acid is incorporated into the aqueous coating composition in the form of a gel-like aqueous dispersion containing evenly dispersed particles of fumed silica, said thickening agent also being compatible with the tannic acid as used in the aqueous coating composition.

2. A method according to claim 1 wherein all the tannic acid used in the acidic aqueous coating composition is incorporated therein as a component of the gel-like aqueous dispersion of the thickening agent.

3. A method according to claim 1 wherein the film-forming polymer which is used is derived from a chlorine-containing monomer.

4. A method according to claim 3 wherein the film-forming polymer which is used is a copolymer of (i) vinyl chloride, (ii) vinylidene chloride and (iii) one or more alkyl acrylates or alkyl methacrylates having from 1 to 12 carbon atoms in the alkyl group.

5. A method according to claim 3 wherein the copolymer used contains one or more alpha-beta unsaturated carboxylic acids.

6. A method according to claim 1 wherein an ionic surfactant added after the formation of the film-forming polymer is incorporated into the thickened aqueous composition.

7. A method according to claim 1 wherein the thickening agent which is used is selected from linear polysaccharides and maleic anhydride/methyl vinyl ether copolymers.

8. A method according to claim 1 wherein at least 0.5% (by weight on the film-forming polymer) of tannic acid is used.

9. A method according to claim 8 wherein 3 to 15% of tannic acid is used.

10. A method according to claim 1 wherein the fumed silica is used in an amount of 1 to 5% (by weight on the film-forming polymer).

11. A method according to claim 1 wherein the thickening agent is used in an amount of 0.05 to 0.8% (by weight on film-forming polymer).

12. A thickened acid aqueous coating composition comprising tannic acid and a latex of a film-forming polymer which composition is substantially free from non-ionic surfactants wherein the aqueous coating composition has been thickened with a thickening composition comprising a gel-like aqueous dispersion comprising a water-soluble thickening agent for the aqueous latex which is non-complexing with tannic acid and containing evenly dispersed particles of fumed silica, said thickening agent also being compatible with the tannic acid as used in the aqueous coating composition.

13. A thickened composition according to claim 12 wherein all the tannic acid used in the composition is incorporated therein as a component of the gel-like aqueous dispersion of the thickening agent.

14. A thickened composition according to claim 12 wherein the film-forming polymer is derived from a chlorine-containing monomer.

15. A thickened composition according to claim 14 wherein the film-forming polymer is a copolymer of (i) vinyl chloride, (ii) vinylidene chloride and (iii) one or more alkyl acrylates or alkyl methacrylates having from 1 to 12 carbon atoms in the alkyl group.

16. A thickened composition according to claim 14 wherein the copolymer contains one or more alpha-beta unsaturated carboxylic acids.

17. A thickened composition according to claim 12 wherein the composition incorporates an ionic surfactant added after the formation of the film-forming polymer.

18. A thickened composition according to claim 12 wherein the thickening agent which is used in the composition is selected from linear polysaccharides and maleic anhydride/methyl vinyl ether copolymers.

19. A thickened composition according to claim 12 wherein the composition contains at least 0.5% (by weight on the film-forming polymer) of tannic acid.

20. A thickened composition according to claim 19 wherein the composition contains 3 to 15% of tannic acid.

21. A thickened composition according to claim 12 wherein the composition contains fumed silica in an amount of 1 to 5% (by weight on the film-forming polymer).

22. A thickened composition according to claim 12 wherein the thickening agent in the composition is used in an amount of 0.05 to 0.8% (by weight on film-forming polymer).

* * * * *